United States Patent
Branlard et al.

(10) Patent No.: US 8,734,692 B2
(45) Date of Patent: May 27, 2014

(54) METHOD FOR COMPACTING A POWDERY COMPOSITION AT CONSTANT VOLUME

(75) Inventors: Paul Branlard, Lyons (FR); Jacques Brosse, La Grand Croix (FR); Laurent Kirchhoff, St Just St Rambert (FR); Gilles Rubinstenn, Paris (FR)

(73) Assignee: Eurotab, St. Just St. Rambert (FR)

( * ) Notice: Subject to any disclaimer, the term of this patent is extended or adjusted under 35 U.S.C. 154(b) by 621 days.

(21) Appl. No.: 12/682,244

(22) PCT Filed: Oct. 10, 2008

(86) PCT No.: PCT/EP2008/063597
§ 371 (c)(1),
(2), (4) Date: Aug. 12, 2010

(87) PCT Pub. No.: WO2009/047322
PCT Pub. Date: Apr. 16, 2009

(65) Prior Publication Data
US 2010/0297320 A1   Nov. 25, 2010

(30) Foreign Application Priority Data

Oct. 12, 2007 (FR) .................................. 07 58272
Feb. 26, 2008 (EP) .................. PCT/EP2008/052311
Jul. 18, 2008 (FR) .................................. 08 54909

(51) Int. Cl.
*B29C 67/00* (2006.01)

(52) U.S. Cl.
USPC .......................... 264/40.1; 264/109; 264/319

(58) Field of Classification Search
USPC ........................................ 264/40.1, 109, 319
See application file for complete search history.

(56) References Cited

U.S. PATENT DOCUMENTS

| | | | |
|---|---|---|---|
| 3,121,635 A | 2/1964 | Eldred | |
| 3,511,666 A | 5/1970 | Hudson et al. | |
| 3,770,457 A | 11/1973 | Makwinski et al. | |
| 5,202,067 A * | 4/1993 | Solazzi et al. | 264/40.5 |

FOREIGN PATENT DOCUMENTS

| | | |
|---|---|---|
| CA | 808 588 | 3/1969 |
| EP | 0 229 920 | 7/1987 |
| JP | 62-036173 A | 2/1987 |
| JP | 2003-112298 | 4/2003 |

* cited by examiner

*Primary Examiner* — James Sanders
(74) *Attorney, Agent, or Firm* — Blakely Sokoloff Taylor & Zafman

(57) ABSTRACT

A method for compacting powdery compositions wherein the composition is compacted down to a reduced volume and the composition is then maintained at constant volume until the solid compact product is obtained.

10 Claims, 7 Drawing Sheets

METHOD FOR COMPACTING A POWDERY COMPOSITION AT CONSTANT VOLUME

Figure 1:
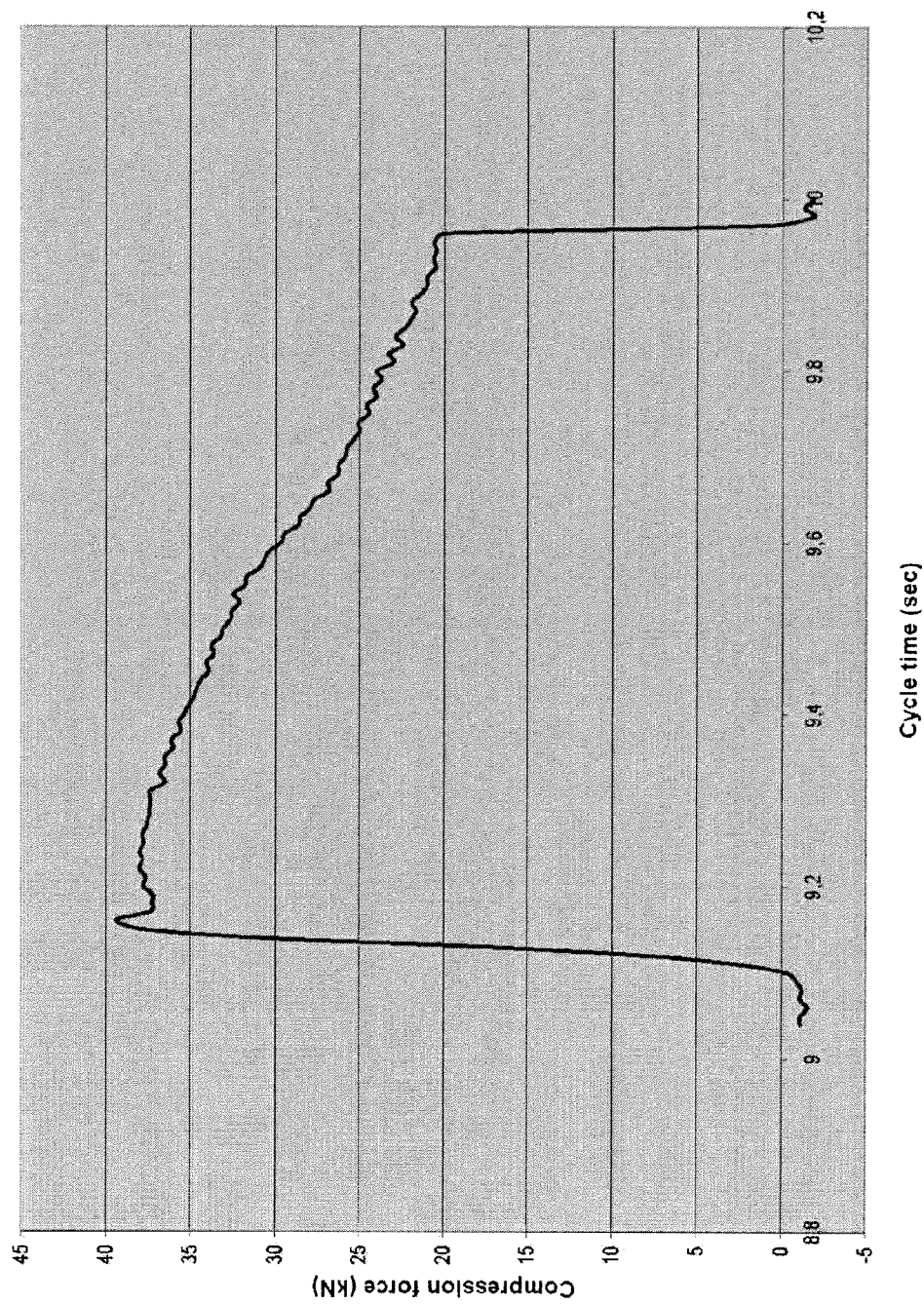

This is a non-provisional application claiming the benefit of International application number PCT/EP2008/063597 filed Oct. 10, 2008.

The present invention relates to a method for compacting powdery compositions and notably compositions having elastic or thermofusible properties.

For reasons of facility of transport, handling and use, it is increasingly current to have compact products. Thus, in many fields, it is sought to transform compounds originally in powdery form into compact products in order to facilitate and secure their transport, their handling and their use.

However, compaction of certain compounds as powders at sufficient rates, in order to allow industrial exploitation, is made particularly difficult because of the chemical composition and of the physical characters of these powders. Indeed, certain powders may have a strong elastic deformation component, and/or a change of state passing from a solid to a paste or even to a liquid under the action of mechanical stresses generated by the compaction. These characteristics cause instability of the products obtained by compaction of these powders according to standard compaction methods of the prior art: thus the obtained products may be unstable, brittle and subject to attrition when a low compaction force is used. On the contrary, the obtained products have cleavage or adhesive bonding phenomena and therefore unsatisfactory brittleness, when a high compaction force is used.

Thus, for example, compaction of plant compounds in the form of powders with sufficient rates for allowing industrial exploitation is particularly difficult because of the chemical composition of the natural plants composing these powders. Indeed, the plant compounds present in these powders often comprise polymers or mixtures of highly heterogeneous natural polymers, such as for example cellulose, hemicellulose, lignin, which have a strong elastic deformation component. However, it would be useful to have compact products available based on natural plant compounds milled beforehand and found in the state of powders.

It may be proposed to add excipients to these powders in order to limit these effects. However, in particular in the field of the food industry, these excipients should be able to be ingested. They should neither alter the taste or the effect of the food product in which they are added. More generally, it is always desirable not to have to resort to complexification of the initial formula.

Thus, there is a need for a method for industrially compacting powders with elastic properties, thermofusible properties, or more generally with a tendency of changing state under the action of compaction, in order to obtain compact products having stability and strength making them easy to transport and to handle.

The problem is therefore to develop compact products. The applicant has now surprisingly noticed that compacting powders at constant volume rather than at constant pressure, makes it possible to obtain products which are both sufficiently resistant and retaining their properties.

With the method according to the invention, it is advantageously possible to obtain compact products from powders having elastic or thermofusible properties.

Advantageously, with the method according to the invention, it is possible to provide compact products having good solidity during normal handling operations of said products.

Another advantage of the invention is that the method allows manufacturing of large series of compact products with high productivity from powdery compositions having an elastic or thermoplastic component.

In a particularly advantageous way, the method according to the invention allows compaction of powdery compositions intended for food without altering their gustatory properties.

DESCRIPTION OF THE INVENTION

The object of the invention is therefore a method for preparing a solid compact product with a determined volume from a powdery composition comprising the following steps:
a) placing an initial volume of the powdery composition in a confined space,
b) compacting said powdery composition down to a compaction volume less than or equal to the determined volume,
c) maintaining said composition at said compaction volume until the holding force decreases by at least 10%,
d) releasing the volume constraint,
e) obtaining the solid compact product of a determined volume.

Advantageously, in the method according to the invention, the powdery composition contains at least one powder having elastic and/or thermofusible properties.

In a preferred embodiment, the powdery composition consists of particles having a size comprised between 10 and 3,000 microns, preferably between 100 and 1,500 microns.

In another preferred embodiment, the amount of powdery composition applied in step a) is comprised between 0.5 grams and 600 grams, preferably between 0.5 and 100 grams, more preferentially between 1 and 50 grams.

Preferably, the compaction volume is comprised between 20 and 95% of the initial volume of the powdery composition, and preferentially between 30 and 75% of the initial volume of the powdery composition.

Advantageously, the time required for compaction in step b) is comprised between 1 and 3,000 milliseconds, and more advantageously between 10 and 1,500 milliseconds.

Advantageously, the time required for maintaining the composition at the compaction volume in step c) is comprised between 100 and 2,500 milliseconds, and more advantageously between 150 and 1,500 milliseconds.

Advantageously, the time required for releasing the volume constraint in step d) is comprised between 10 and 1,000 milliseconds, more advantageously between 15 and 500 milliseconds.

In a preferred embodiment, the holding force decreases by 10-60% in step c) of the method according to the invention.

The object of the invention is also the products obtained by the method according to the invention.

The method according to the present invention is particularly adapted to the compaction of powdery compositions comprising at least one powder having elastic properties or thermofusible properties. The method according to the invention is also adapted to the compaction of powdery compositions having a tendency of changing state during compaction, for example passing from a solid state to a pasty or liquid state. These may be powdery compositions having high humidity content.

By "elastic", is meant a material which has the property of resuming, either partly or totally, its shape or its volume, after having lost them by compression or extension.

By "thermofusible", is meant a material which becomes fluid under the effect of heat.

In an embodiment, the powdery compositions applied in the methods according to the present invention consist of a powder or a mixture of powders, at least one of which has elastic or thermofusible properties.

In a particular embodiment of the invention, the method allows compaction of powdery compositions based on plant materials.

The method may be applied with plant ingredients such as coffee, tea or chicory or plant ingredients capable of making herbal teas, such as thymian, rosemary, linden, ginseng, ginko, marjoram, mint, verbena, ginger, wild yam, plants from the family of *rosmarinus officinalis*, and mixtures thereof.

The plant compounds applied in the invention generally appear as grains or broken or milled leaves and optionally having been subject to one or more preliminary treatments known par se.

The method according to the present invention may in particular be applied to materials such as cellulose, hemicellulose, lignin and mixtures thereof. The invention may also be applied to wood fibers, algae, tea, aromatic herbs, dry milled plant stems, compost, dried flowers.

According to another particular embodiment of the invention, the compaction method is in particular suitable for compacting any types of food powders comprising carbohydrates, lipids and/or proteins.

In another embodiment of the invention, the method is applied for compacting compositions of the washing agent type for washing laundry.

These compositions typically comprise: sequestering agents, alkaline agents, bleaching agents, anionic, cationic or non-ionic surfactants (in liquid, solid form, supported on zeolites, bentonites or clays in general), bleaching agent activators, enzymes, bursting agents, binders for perfumes, dyes, antifoam. agents, optical brighteners, anti-dye transfer agents including bursting agents of the cellulose type having elastic properties, binders for example, solid polyethylene glycols, solid surfactants of the SDS type, or liquid surfactants supported on bentonite having thermofusible behaviors.

Generally, the method according to the invention is suitable for compacting any types of materials, and more particularly materials appearing as a powdery composition having elastic or thermofusible properties.

With the method according to the invention, it is possible to obtain a solid compact product from a powdery composition. In the methods according to the present invention, an initial volume of powder is compacted down to a compaction volume and then the powder is maintained at this constant volume by means of a variable holding force during a given period. The holding force gradually decreases while maintaining the compaction volume constant.

The first step consists of placing an initial volume of the powdery composition in a confined space. The latter may have a particular shape depending on the sought shape for the compacted product. By initial volume of the powdery composition, is meant the volume of the loose powder before compaction such as it is placed in the confined space.

Next, it is proceeded with compaction of the powdery composition down to a compaction volume. The compaction volume is less than the initial volume of the powdery composition. Preferably, the compaction volume is comprised between 20 and 95% of the initial volume of the powdery composition, and preferentially between 30 and 75% of the initial volume of the powdery composition. This volume reduction or this compaction rate depends on the bulk density of the powdery composition applied in the method according to the invention.

Moreover, the compaction volume is less than or equal to the determined volume of the compact product. By determined volume of the compact product is meant the final volume of the compact product and therefore the volume which is desirably obtained. Indeed, when the powdery composition is particularly elastic, there may be an extension of the product upon releasing the volume constraint. Typically, the compaction volume accounts for 50 to 100% of the determined or final volume of the compact product. This essentially depends on the elastic properties of the materials making up the powdery composition.

In the next step, the powdery composition is maintained at a constant volume which corresponds to the compaction volume. The time for maintaining a constant compaction volume is essential for obtaining satisfactory compact products. This holding time may be determined experimentally.

The powdery composition has strength and it is therefore necessary to exert a holding force in order to retain the constant compaction volume. During this step, the strength of the powdery composition will gradually decrease. The holding force required for maintaining the compaction volume constant will therefore decrease concomitantly. By measuring this holding force and its variation during the maintaining of a constant compaction volume, it is possible to determine the time during which the composition has to be maintained at the constant compaction volume. The holding force over time may be measured according to techniques known to the person skilled in the art. Thus, the measurement of the holding force over time allows determination of the compression curve of a given powdery composition. This compression curve is specific to each powdery composition depending on its elastic or thermofusible properties, or further depending on its humidity content.

Advantageously, the applicant has found that the force for maintaining a constant compaction volume has to be maintained at least until a loss of at least 10% of the resistant force of the powdery composition.

Thus, the composition is maintained at a constant compaction volume until the required holding force decreases by at least 10, 20, 30, 40, 50 or 60%.

Another advantage of the invention is that it is not necessary to exert a high holding force causing modification of the compacted materials. For example in the case of food powders, with the method according to the invention, the gustatory properties of the products may thereby be retained. Generally, the properties of the starting materials are retained. Preferably, there is no or very little "overcompression", excessive exudation, liquefaction or change of state of the materials making up the powdery composition during the method according to the invention.

Typically, the initial holding force required for maintaining a constant compaction volume is comprised between 10 kN and 100 kN, preferably between 20 kN and 80 kN, 20 kN and 60 kN and more preferentially between 20 kN and 50 kN, it being understood that this holding force gradually decreases when maintaining a constant compaction volume.

Preferably, the time for maintaining a constant volume is longer than the time for the compaction and than the time for release.

The method then ends by releasing the holding force and the volume constraint and with the recovery of the solid compact product.

The compaction according to the invention is preferably carried out with a compacting (or forming) system in which the applied force is transmitted by displacement over a determined length of one or two walls (sometimes called a punch) surrounding the material to be compacted.

An advantageous embodiment according to the invention consists of applying a cam press, i.e. where the displacement of the wall(s) of the confinement space is determined by a connecting rod, the movement of which is determined by a cam, the results of the invention being much easier to obtain than if the use of a hydraulic press is attempted.

These presses advantageously include a tube of the extruder type, with a punch at one end, or a punch at each end.

The present invention allows the preparation of resistant stable compact products, therefore easy to handle and to store.

Advantageously, the final product obtained has the following properties:
- a mass comprised between 0.5 grams and 600 grams, preferably between 0.5 and 100 grams, preferentially between 1 and 50 grams;
- a compaction level comprised between 20 and 95%, preferably greater than 30%;
- a hardness comprised between 20 and 500 kN, preferably greater than 25 kN.

In a preferred embodiment, the solid compact product has the shape of a lozenge or a tablet.

In a particular embodiment, the compact product has porosity comprised between 5% and 80%, preferably less than 70%. For certain applications, it is advantageous to have compact products which easily disintegrate in water. This for example may be obtained by means of a certain porosity of the product.

The examples and figures, not given as a limitation, illustrate the invention and show how it may be applied.

FIGURES

Figure 2:
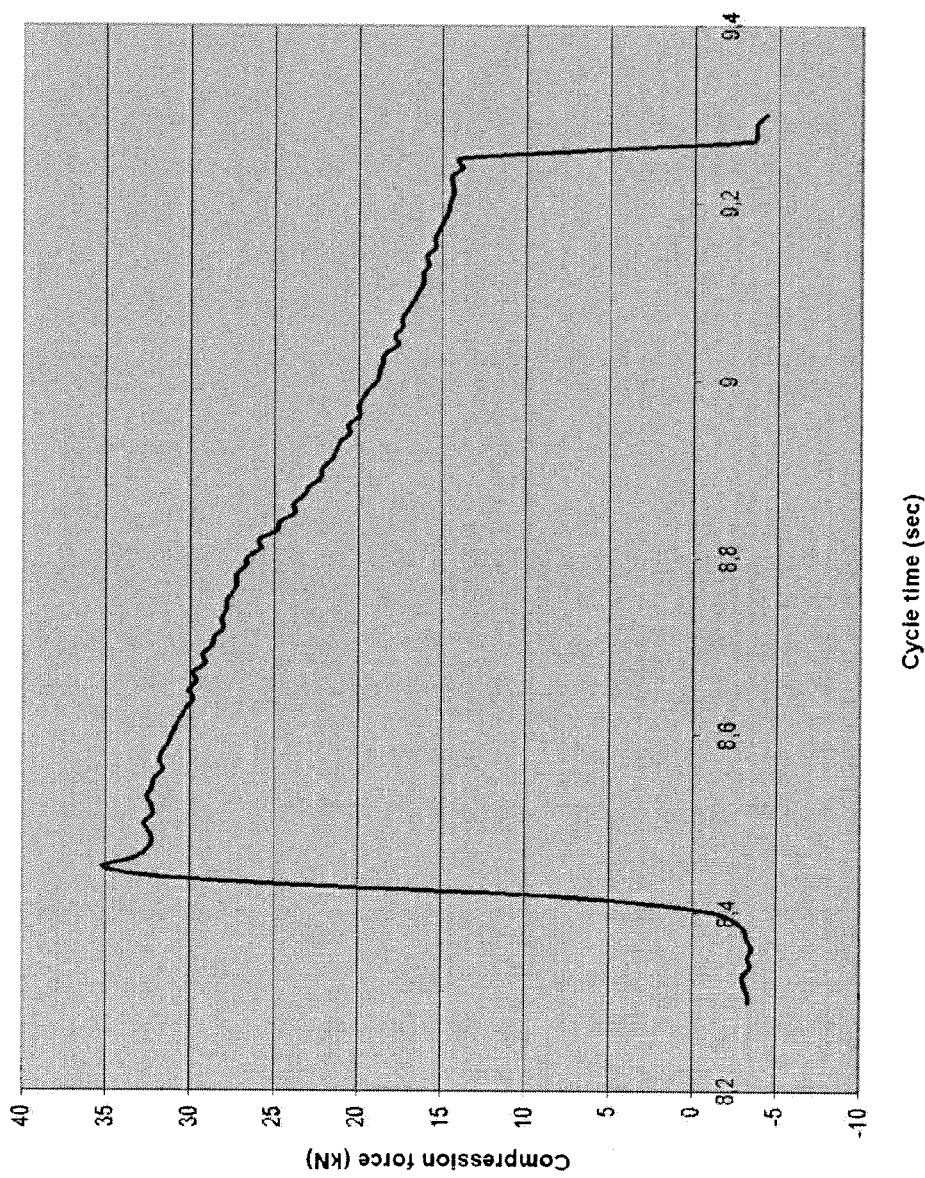
Figure 3:
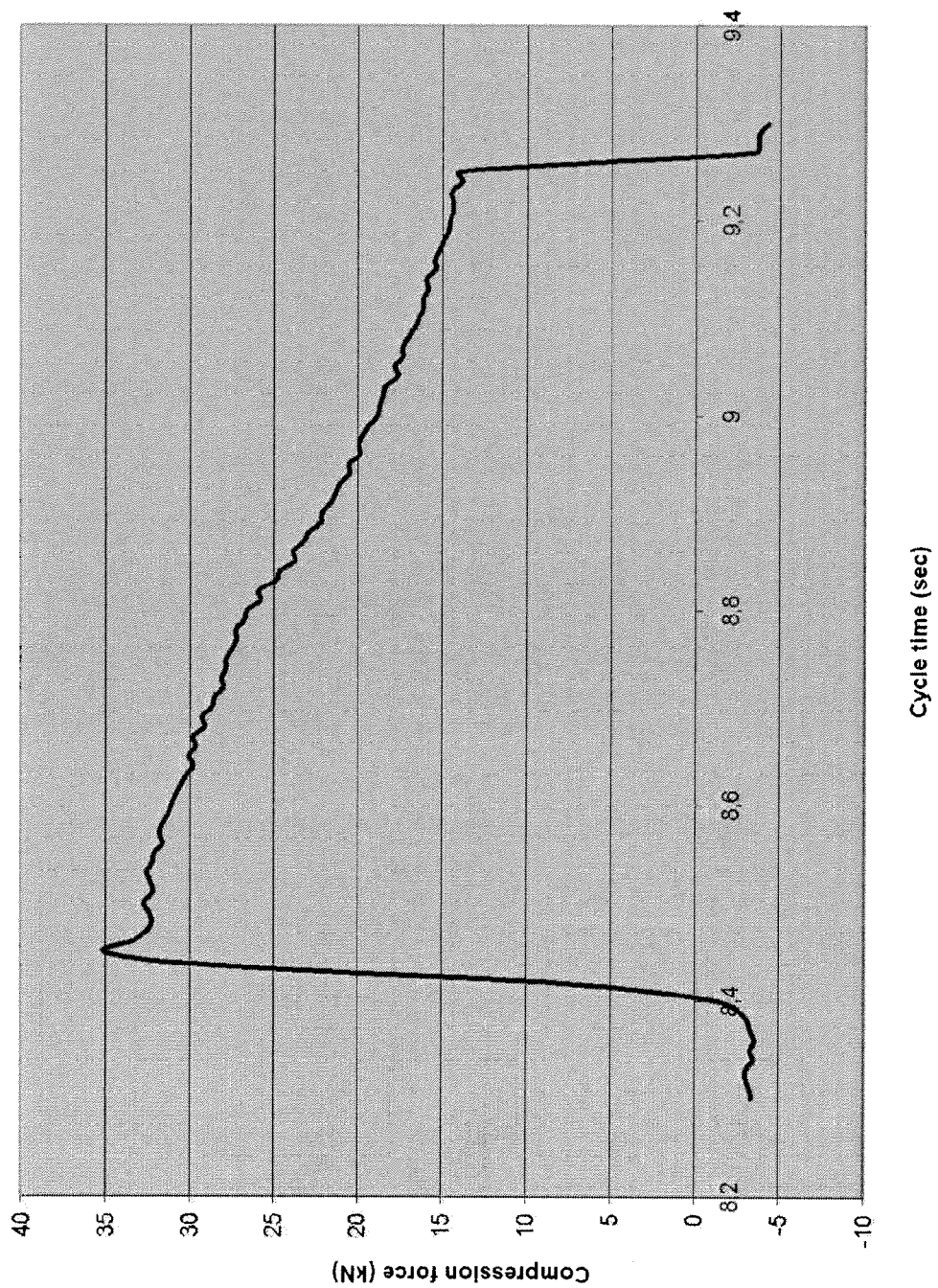
Figure 4:
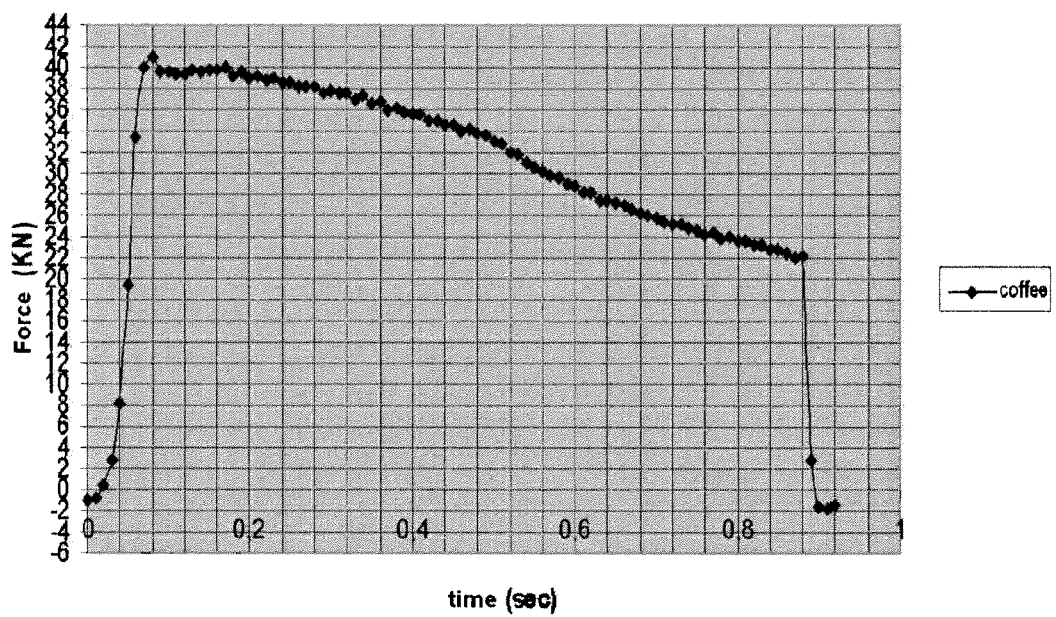
Figure 5:
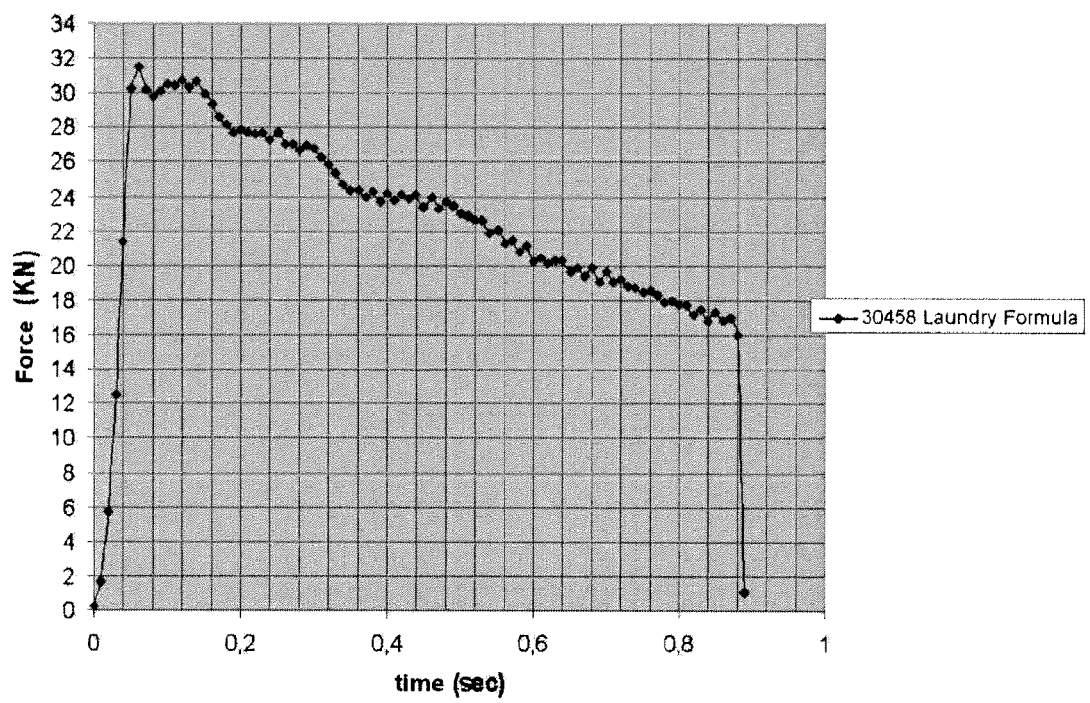
Figure 6:
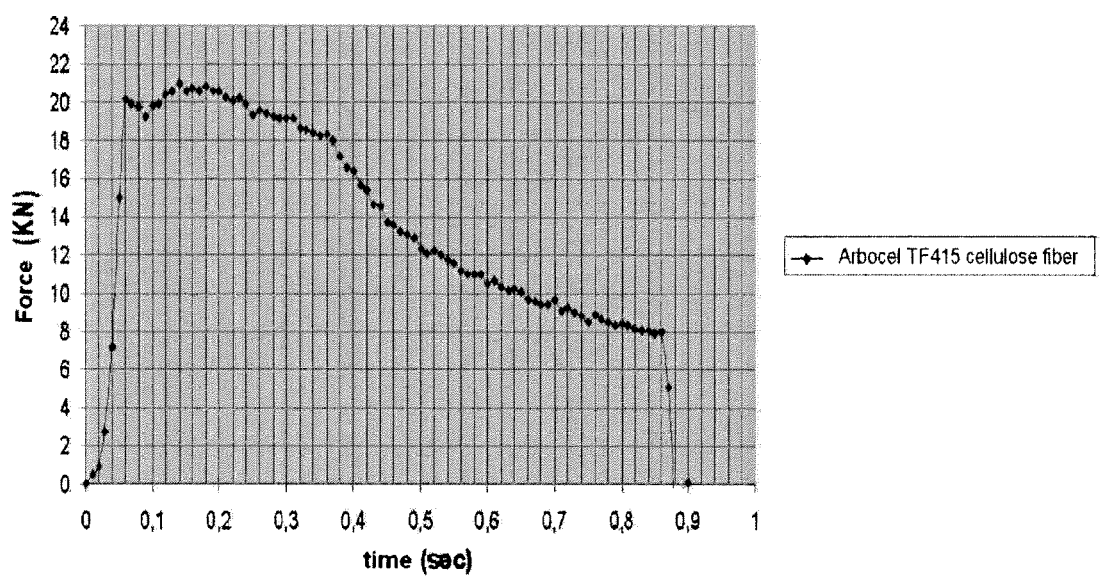
Figure 7:
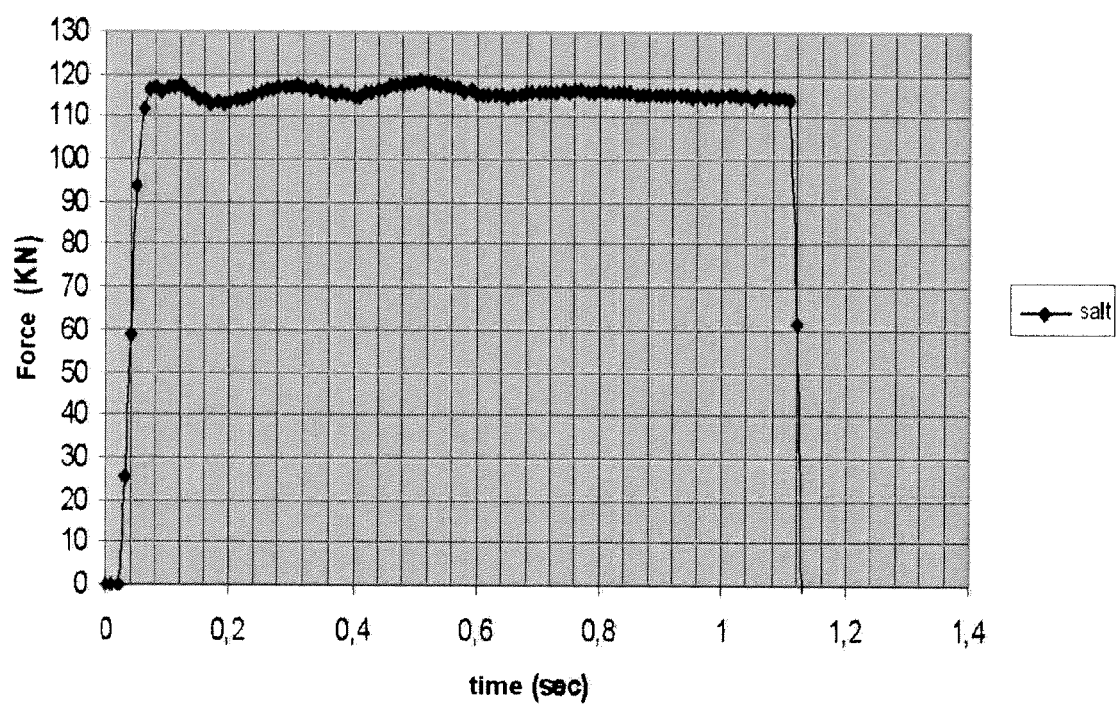

FIG. 1: Compression curve of the coffee of Example 1
FIG. 2: Compression curve of the coffee of Example 2
FIG. 3: Compression curve of the coffee of Example 3
FIG. 4: Compression curve of the coffee of Example 10
FIG. 5: Compression curve of the laundry formula of Example 11
FIG. 6: Compression curve of the cellulose of Example 12
FIG. 7: Compression curve of the salt of Example 13

EXAMPLES

Example 1

Roasted and ground coffee with an average grain size of 1 mm, and having a volatile material loss of 4% after dwelling for 20 min at 120° C., is compacted by means of a compacting system with which it is possible to reach a controlled constant volume. 7 g of powder are reduced down to 30% of their initial volume within 0.4 seconds, and this volume is maintained for 0.85 seconds. A cylindrical flat tablet is obtained with a density of 0.76 g/cm$^3$. This tablet has a 4% loss of volatile materials after dwelling for 20 min at 120° C.; under 40 megapascals at 20° C., it exudes 0.05% oil; under 100 megapascals at 20° C. it exudes 0.25% oil. A force of 50 Newtons is applied along a transverse diameter; the tablet is not damaged. 5 similar tablets fall from 1.5 m and give a weight loss by breakage greater than 30%; 5 other tablets falling from 1 m give only a weight loss of 3%.

Examples 2-9

Example 1 is reproduced with different operating conditions. These conditions and the obtained results are indicated, with those of Example 1 in the following table, the other conditions and results being the same as in Example 1.

| EXAMPLE | 1 | 2 | 3 | 4 | 5 | 6 | 7 | 8 | 9 |
|---|---|---|---|---|---|---|---|---|---|
| Applied amount of powder in grams | 7 | 7 | 7 | 7 | 7 | 6 | 8 | 7 | 7 |
| Compaction with powder volume reduction (expressed in percent) | 30 | 30 | 30 | 30 | 30 | 30 | 30 | 40 | 20 |
| Compaction duration in seconds before reaching the final minimum volume | 0.4 | 0.4 | 0.4 | 0.4 | 0.4 | 0.4 | 0.4 | 0.4 | 0.4 |
| Force application duration in seconds for maintaining the volume constant (of the tablet) | 0.85 | 0.65 | 0.85 | 0.85 | 1.1 | 1.1 | 0.65 | 1.1 | 0.65 |
| Density of the produced tablet in g/cm$^3$ | 0.76 | 0.69 | 0.82 | 0.65 | 0.87 | 0.63 | 0.81 | 0.69 | 0.90 |
| Volatile material loss of the initial powder and of the final tablet within 20 min at 120° C. (in percent) | 4 | 4 | 6 | 3 | 4 | 4 | 4 | 4 | 4 |
| Exudation at 40 megapascals in percent | 0.05 | 0.05 | 0.05 | 0.05 | 0.05 | 0.05 | 0.05 | 0.02 | 0.02 |
| Exudation at 100 megapascal in percent | 0.245 | 0.245 | 0.28 | 0.21 | 0.245 | 0.21 | 0.315 | 0.22 | 0.26 |
| Force, in Newtons, applied along a transverse diameter without any breakage | 50 | 40 | 55 | 35 | 60 | 33 | 55 | 40 | 60 |
| Weight loss by breaking 5 tablets falling from 1 m | 3 | 4 | 3 | 5 | 1 | 3 | 2 | 4 | 1 |
| Weight loss, in percent by breaking 5 tablets falling from 1.5 m | >30 | >40 | >20 | >40 | >20 | >35 | >28 | >50 | >15 |

Example 10

Roasted and ground coffee with an average grain size of 1 mm, and having a volatile material loss of 3.3% after dwelling for 20 min at 120° C., is compacted by means of a compacting system with which a controlled constant volume may be reached. The punch used for this compression is a round punch with a diameter of 32 mm, with chamfer. 7 g of this product are introduced into the compaction chamber representing a filling height of 27.3 mm. The final compression height is set to 8.3 mm leading to a volume reduction of 70%. This compression height is maintained for a period of 800 milliseconds. The measured maximum force is 40 kN, and only 20 kN after the 800 milliseconds of the holding time. We may therefore infer therefrom that it is necessary to ensure a holding time in order to obtain a cohesive tablet. In the present case, the minimum holding time for obtaining a cohesive and transportable tablet is 400 milliseconds. At 400 milliseconds, the resulting force is 30 kN. The drop of this holding force is equal to 25%.

Example 11

A laundry formulation from Eurotab® designated as 30458 is tested in order to check whether it is necessary to maintain a period for maintaining constant volume in order to obtain a cohesive and transportable tablet. For this test, a round punch of diameter 45 mm with chamfer, a standard punch for the laundry tablet application, is used. 40 grams of this formulation 30458 are introduced into the compaction chamber representing a filling height of 38 mm. The final compression height is set to 18 mm leading to a volume reduction of 53%. This compression height is maintained for a period of 800 milliseconds. The measured maximum force is 31.5 kN, and only 18 kN after the 800 milliseconds of the holding time. We may therefore infer therefrom that it is necessary to ensure a holding time in order to obtain a cohesive tablet. In the present case, the minimum holding time for obtaining a cohesive and transportable tablet is 100 milliseconds. At 112 milliseconds, the resulting force is 28 kN. The drop of this holding force is equal to 11%.

| Tablet composition for white laundry | |
|---|---|
| Sequestering agents (phosphates, citrate, polymers, zeolite . . .) | 35-50% |
| Alkaline agents (sodium silicate, carbonate) | 10-30% |
| Filler (bicarbonate, sodium sulfate . . .) | 3-20% |
| Non-ionic and ionic surfactants | 10-18% |
| Enzymes | 0.5-3% |
| Bleaching agents and activator | 10-20% |
| Binder (polyethylene glycol powder . . .) | 1-5% |
| Disintegrating agents (cellulose . . .) | 2-8% |
| Optical brightener | 0-1% |
| Anti-foam agent | 0-1% |
| Perfume | 0.5%-1% |
| Coloring agent | 0.05%-0.1% |

Example 12

ARBOCEL™ TF 415 (cellulose), marketed by Rettenmaier®, is tested in order to check whether it is necessary to maintain a constant volume holding period in order to obtain a cohesive and transportable tablet. For this test, a round punch with a diameter of 32 mm with chamfer is used. 8.45 grams of this ARBOCEL™ TF 415 are introduced into the compaction chamber representing a filling height of 28 mm. The final compression height is set to 9 mm, leading to a volume reduction of 68%. This compression height is maintained during a period of 800 milliseconds. The measured maximum force is 21 kN, and only 8 kN after the 800 milliseconds of the holding period. We may therefore infer therefrom that it is necessary to ensure a holding time in order to obtain a cohesive tablet. In the present case, the minimum holding time for obtaining a cohesive and transportable tablet is 300 milliseconds. At 300 milliseconds, the resulting force is 18 kN. The drop of this holding force is equal to 14.3%.

Example 13

Sodium chloride is tested in order to check if it is necessary to maintain a constant volume holding period for obtaining a cohesive and transportable tablet. For this test, a round punch with a diameter of 32 mm with chamfer, punch is used. 20 grams of this sodium chloride are introduced into the compaction chamber representing a filling height of 18.3 mm. The final compression height is set to 9.2 mm, leading to a volume reduction of 49.7%. This compression height is maintained for a period of 800 milliseconds. The maximum measured force is 117 kN, and 115 kN after the 800 milliseconds of holding time. We may therefore infer therefrom that it is not necessary to ensure a holding period in order to obtain a cohesive tablet, the drop of this holding force being less than 10%

The invention claimed is:

1. A method for preparing a solid compact product with a determined volume from a powdery composition, comprising the following steps:
   a) placing an initial volume of the powdery composition in a confined space,
   b) applying a volume constraint for compacting said powdery composition with a variable holding force, wherein
      b1) the volume constraint is first controlled such that the volume of the confined space is reduced down to a compaction volume, said compaction volume being a volume less than or equal to the determined volume, and
      b2) the volume constraint is then controlled such that the volume of the confined space is maintained at said compaction volume until the variable holding force resulting from the volume constraint decreases by at least 10%,
   c) releasing the volume constraint,
   d) obtaining the solid compact product with the determined volume.

2. The method according to claim 1, wherein the powdery composition contains at least one powder having elastic or thermofusible properties.

3. The method according to claim 1, wherein the powdery composition consists of particles having a size comprised between 10 and 3,000 microns.

4. The method according to claim 1, wherein the amount of powdery composition applied in step a) is comprised between 0.5 grams and 100 grams.

5. The method according to claim 1, wherein the compaction volume is comprised between 20 and 95% of the initial volume of the powdery composition.

6. The method according to claim 1, wherein the time required for compaction in step b1) is comprised between 1 and 3000 milliseconds.

7. The method according to claim 1, wherein the time required for maintaining the composition at the compaction volume in step b2) is comprised between 100 and 2,500 milliseconds.

8. The method according to claim 1, wherein the time required for releasing the volume constraint in step c) is comprised between 10 and 1,000 milliseconds.

9. The method according to claim 1, wherein in step b2) the holding force decreases by 10 to 60%.

10. A method for preparing a solid compact product with a determined volume from a powdery composition, comprising the following steps:
- i) measuring a holding force required for maintaining a powdery composition at a constant compaction volume, said compaction volume being a volume less than or equal to the determined volume, and determining a compression curve of said powdery composition representing the variations of the holding force during the maintaining of the constant compaction volume,
- a) placing an initial volume of the powdery composition in a confined space,
- b) applying a volume constraint for compacting said powdery composition with a variable holding force, wherein
  - b1) the volume constraint is first controlled such that the volume of the confined space is reduced down to the compaction volume, and
  - b2) the volume constraint is then controlled using the compression curve such that the volume of the confined space is maintained at said compaction volume until the variable holding force decreases by at least 10%,
- c) releasing the volume constraint,
- d) obtaining the solid compact product with the determined volume.

* * * * *

UNITED STATES PATENT AND TRADEMARK OFFICE
CERTIFICATE OF CORRECTION

PATENT NO. : 8,734,692 B2
APPLICATION NO. : 12/682244
DATED : May 27, 2014
INVENTOR(S) : Paul Branlard et al.

It is certified that error appears in the above-identified patent and that said Letters Patent is hereby corrected as shown below:

On the Title Page, in Item (75), under Inventors, please delete "Lyons" and insert --Lyon--.

Signed and Sealed this
Twenty-eighth Day of October, 2014

Michelle K. Lee
*Deputy Director of the United States Patent and Trademark Office*